United States Patent [19]

Summers

[11] Patent Number: 5,090,478
[45] Date of Patent: Feb. 25, 1992

[54] METHOD FOR REDUCING WATER PRODUCTION FROM A GRAVEL PACKED WELL

[75] Inventor: Laine E. Summers, Katy, Tex.

[73] Assignee: Conoco Inc., Ponca City, Okla.

[21] Appl. No.: 621,114

[22] Filed: Nov. 30, 1990

[51] Int. Cl.⁵ .............................................. E21B 43/04
[52] U.S. Cl. ..................................... 166/278; 166/295
[58] Field of Search ................. 166/278, 295, 51, 116

[56] References Cited

U.S. PATENT DOCUMENTS

| | | |
|---|---|---|
| 3,208,525 | 9/1965 | Caldwell et al. |
| 3,831,383 | 8/1974 | Crank ............................ 166/295 X |
| 4,272,384 | 6/1981 | Martin ........................... 166/295 X |
| 4,291,766 | 9/1981 | Davies et al. .................. 166/295 X |
| 4,817,720 | 4/1989 | Friedman et al. ............. 166/295 |
| 4,921,047 | 5/1990 | Summers et al. .............. 166/276 |
| 4,972,906 | 11/1990 | McDaniel ....................... 166/276 |

Primary Examiner—Ramon S. Britts
Assistant Examiner—Roger J. Schoeppel
Attorney, Agent, or Firm—Richard W. Collins

[57] ABSTRACT

A water-producing zone in a reservoir penetrated by a gravel-packed well is isolated by placing a bridge plug in the well tubing adjacent to the top of the water-producing zone, then placing a first coarse sand on the bridge plug, followed by a fine sand on top of the coarse sand, and finally by placing a flowable resin on top of the fine sand where it spreads out through the gravel pack to provide a flow barrier to water.

2 Claims, 2 Drawing Sheets

METHOD FOR REDUCING WATER PRODUCTION FROM A GRAVEL PACKED WELL

BACKGROUND OF THE INVENTION

1. Field Of The Invention

This invention related to production of hydrocarbon fluid from a subterranean formation, and more particularly to a method for reducing water production from a gravel packed well penetrating the formation.

In typical water drive reservoirs in the Gulf Coast area, water encroachment from below the hydrocarbon zone leads to operating problems, and eventually makes the wells uneconomical to operate. There has been a continuing need for an economical and efficient method for reducing water production from such wells.

In a typical gravel packed well, a perforated section of production tubing is wrapped with a screen, and the wrapped section is located adjacent a hydrocarbonproducing zone. Channels between the screen and tubing permit flow from the screened interval to the tubing perforations. The annulus between the wellbore wall and the screen around the tubing is then "packed" with sand of a particular size range. The sand is commonly referred to as gravel, although it is typically a 40/60 mesh sand. The sand or "gravel" is intended to prevent formation damage during production, and is sized so that it will not pass through openings in the screen around the production tubing. As the well is produced, the water level encroaches upwardly to the gravel packed zone, and remedial procedures which isolate the encroaching water from the production tubing are necessary.

2. The Prior Art

Cement has been used in the past to isolate the water zone from the production tubing, but there are problems with use of cement for this purpose.

First, when the cement is dump bailed into the wellbore, a malfunction of the bailer can inadvertently bridge off cement in the blank (unperforated) tubing above the gravel pack interval. The cement must then be drilled out to clear the tubing. Second, if the cement formulation is not correct, the cement may not completely penetrate the perforated tubing and may fail to block off channels between the tubing and the gravel pack screen. Third, even if the cement effectively blocks the channels between the tubing and the screen, water still flows upward through the gravel packed annulus.

Recently, a procedure for isolating the water zone in a gravel packed well by placing a settable epoxy resin in the lower part of a gravel pack interval has been developed. This procedure is described in U.S. Pat. No. 4,972,906 issuing Nov. 11, 1990 by S. J. McDaniel. This procedure has met with some success, but presents problems when the interval to be isolated is long, or when there is open casing below the gravel pack. In either case, an excessive amount of resin is required, particularly when dump bailers are used to place the resin.

A method of recompleting wells is described in U.S. Pat. No. 3,208,525 to J. A. Caldwell et al. In that method, a stop device or bridge plug is placed in a cased well above a lower producing zone, and gravel and sand are placed on top of the stop device. An epoxy resin is then placed on top of the sand and gravel to isolate the lower producing zone form an upper producing zone. The procedure differs from that of the present invention in that it seals off an entire producing zone by forming a plug in the well casing, and it is not intended to seal off the lower portion of a gravel packed well.

SUMMARY OF THE INVENTION

According to the present invention, the water encroachment zone of a gravel packed well is isolated by placing a through-tubing bridge plug in the perforated tubing of the gravel pack completion below the hydrocarbonproducing zone, then placing two sand layers on the bridge plug. The first sand layer is made up of sand which is coarser than the sand in the gravel pack. This coarse sand bridges off in the channels between the tubing and the gravel pack screen. The second sand layer is made up of sand which generates a tight matrix in the tubing, so that a liquid resin placed on top of the sand will preferentially flow outward into the gravel pack instead of down the tubing and/or down the channels between the tubing and the gravel pack screen. The resulting disk-like layer of resin prevents further production of water from the encroaching water zone.

DESCRIPTION OF THE PREFERRED EMBODIMENTS

Figure 1:
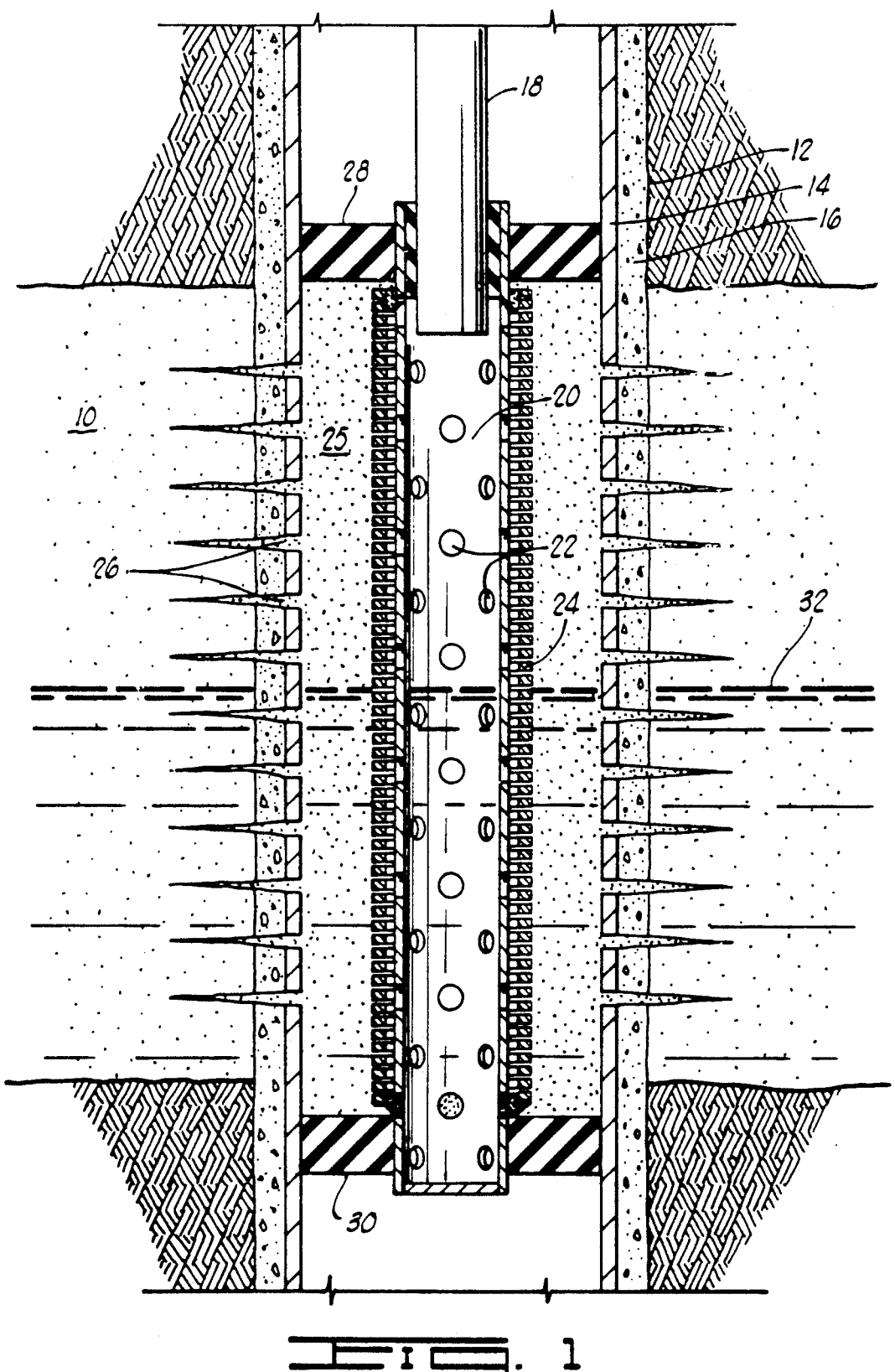
FIG. 1 is a cross section of a gravel pack completion in a producing formation in which water has encroached into a substantial portion of the gravel pack interval.

The water isolation procedure in accordance with a preferred embodiment of the invention will be described with reference to the drawings, in which a hydrocarbon-producing formation 10 is shown penetrated by a wellbore 12. Casing 14 extends through formation 10 and is fixed in place by cement 16 in the annulus between casing 14 and wellbore 12. Production tubing 18 includes an end section 20 having openings 22 formed therein. A screen 24 is spirally wrapped about tubing end section 20.

The annulus between casing 14 and screen 24 is "packed" with gravel 25 in a conventional manner, with the gravel also filling perforations 26 extending through casing 14, cement 16, and into formation 10. The openings between windings of screen 24 are spaced to prevent flow of gravel 25 into tubing end section 20. Upper packer 28 and lower packer 30 are provided to contain gravel 25.

The lower portion of formation 10 contains encroaching water up to level 32, and the upper portion is relatively free of water. As shown in FIG. 1, both water and oil or gas are produced simultaneously.

Figure 2:
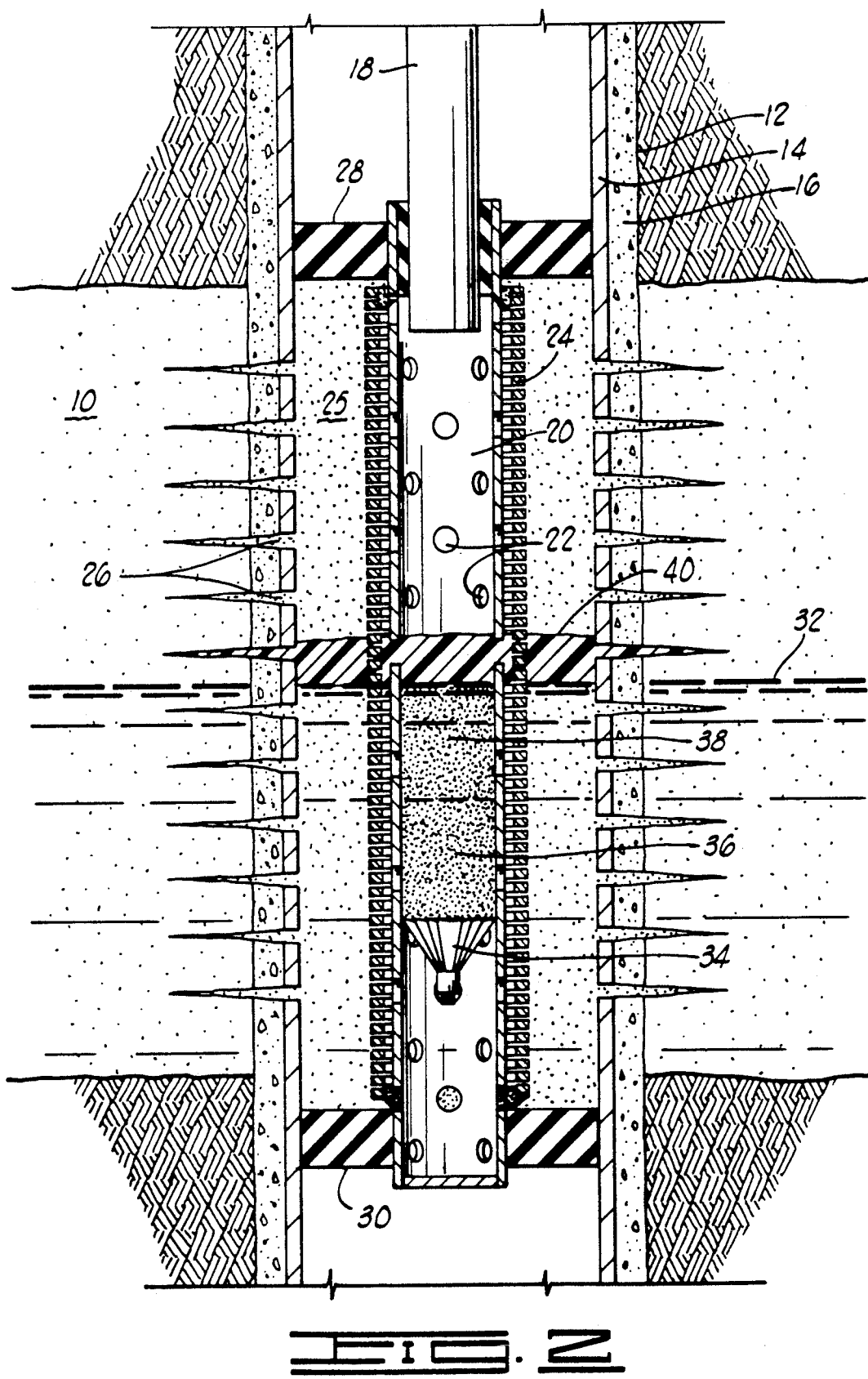
FIG. 2 is a cross section as in FIG. 1 but after a water-blocking layer has been formed in the gravel pack.

In order to reduce or eliminate water production, it is necessary to block off the portion of tubing section 20 below water level 32. Referring now to FIG. 2, a through-tubing bridge plug 34 is placed in tubing section 20 below water level 32. A first coarse sand layer 36 is placed on bridge plug 34, and a second fine sand layer 38 is placed on top of sand layer 36. Coarse sand 36 is sized to bridge any openings around bridge plug 34. Fine sand 38 is sized to provide a tight matrix, and to minimize flow of liquid resin therethrough.

By way of example, gravel 25 may be 40/60 mesh sand (commonly referred to as gravel in this context), and coarse sand 36 may be 20/40 mesh sand. Fine sand 38 may be 80/100 mesh sand.

A settable liquid resin, such as an epoxy resin formulated to set in a reasonably short time at formation conditions, is dump bailed or otherwise placed in tubing section 20 above fine sand layer 38. The resin is designed to flow outwardly through tubing section 20, screen 24 and gravel 25 to form a disk 40 across wellbore 12, with minimal penetration of fine sand layer 38. Upon setting, resin 40 effectively seals off water encroachment from formation 10 to production tubing 18.

It will be appreciated that an actual well would not have the precise demarkation between water zone and hydrocarbon zone as shown in the drawings, and the resin would not form an actual flat disk, but would move downwardly through gravel 25 somewhat, as well as down the channels between screen 24 and tubing and section 20. Nevertheless, the process enables a very substantial reduction of water production, significantly extending the productive life of the well.

The resin can be any suitable material compatible with reservoir conditions and having the requisite flow properties and setting characteristics. Epoxy resins are particularly suited to the process.

In carrying out a typical plug-back procedure in accordance with the invention, a gravel packed well is produced until water production becomes a problem. The well is then killed, and a bridge plug is placed in the production tubing below the hydrocarbon-producing zone. A layer of sand coarser than the gravel pack sand is placed on the bridge plug, and a layer of sand finer than the gravel pack sand is placed over the coarse sand. A settable liquid resin is placed over the layer of fine sand, and the resin flows outwardly to form a resin disk which when set acts as a flow barrier to fluids below the disk. This results in a higher ratio of hydrocarbon to water, and extends the productive life of the well.

I claim:

1. A process for reducing water production from a well having a gravel containing gravel pack traversing a production zone, said gravel pack including a perforated tubing extending through said gravel pack, a screen over a perforated section of said tubing; isolating packers above and below said screen, and gravel packing between said screen and perforated casing adjacent said production zone, said production zone including a lower water-producing interval and an upper hydrocarbon-producing interval, said process comprising:
   (a) placing a bridge plug within said perforated tubing at a position below said hydrocarbon-producing zone;
   (b) placing a layer of coarse sand on said bridge plug, said coarse sand having an average particle size greater than the average particle size of the gravel forming said gravel pack;
   (c) placing a layer of fine sand over said layer of coarse sand, said fine sand having an average particle size smaller than the average particle size of the gravel forming said gravel pack and filling said tubing to a level at or above the top of said water-producing interval;
   (d) placing a settable liquid resin through said tubing onto the top of said layer of fine sand, whereby said resin flows outwardly from said tubing to form a layer of resin extending from said tubing through said gravel; and
   (e) allowing said resin to set, thereby forming a barrier to flow of water from said water-producing zone into said tubing.

2. The process of claim 1 wherein said resin is an epoxy resin.

* * * * *